United States Patent
Saigusa

(10) Patent No.: US 11,119,816 B2
(45) Date of Patent: Sep. 14, 2021

(54) STORAGE MEDIUM STORING AN APPLICATION PROGRAM

(71) Applicant: CANON KABUSHIKI KAISHA, Tokyo (JP)

(72) Inventor: Hirokazu Saigusa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 16/402,060

(22) Filed: May 2, 2019

(65) Prior Publication Data
US 2019/0340015 A1 Nov. 7, 2019

(30) Foreign Application Priority Data
May 7, 2018 (JP) .............................. JP2018-089461

(51) Int. Cl.
| | |
|---|---|
| G06F 9/46 | (2006.01) |
| G06F 9/48 | (2006.01) |
| G06F 9/54 | (2006.01) |
| G06F 9/451 | (2018.01) |
| G06F 9/38 | (2018.01) |

(52) U.S. Cl.
CPC .............. *G06F 9/4843* (2013.01); *G06F 9/38* (2013.01); *G06F 9/451* (2018.02); *G06F 9/542* (2013.01)

(58) Field of Classification Search
CPC .......... G06F 9/4843; G06F 9/451; G06F 9/38; G06F 9/542
See application file for complete search history.

(56) References Cited

U.S. PATENT DOCUMENTS

| | | | | |
|---|---|---|---|---|
| 2004/0257612 | A1* | 12/2004 | Okabe .................. | G06F 9/4843 358/1.15 |
| 2011/0058203 | A1* | 3/2011 | Hwang ................. | G06F 3/1236 358/1.13 |

FOREIGN PATENT DOCUMENTS

JP 2008-9901 A 1/2008

* cited by examiner

*Primary Examiner* — Gregory A Kessler
(74) *Attorney, Agent, or Firm* — Canon U.S.A., Inc. IP Division

(57) ABSTRACT

When a component of a background task is activated by an operating system (OS), the background task requests the OS to activate a foreground task. The foreground task displays a user interface (UI) indicating that processing is in progress. Based on a determination not to display a UI for receiving a user operation based on a print ticket acquired, the foreground task notifies the OS of information indicating completion of the processing.

18 Claims, 13 Drawing Sheets

FIG.4A

```xml
<?xml version="1.0" encoding="utf-8"?>
<PackageInfo xmlns="http://schemeas.microsoft.com/windows/DeviceMetadata/PackageInfo/2007/11/">
  <MetadataKey>
    <HardwareIDList> ~402
      <HardwareID>DOID:MFP1_abcd</HardwareID> ~403
      <HardwareID>DOID:MFP2_ijkl</HardwareID> ~404
    </HardwareIDList>
  </MetadataKey>
</PackageInfo>
```

FIG.4B

```xml
<?xml version="1.0" encoding="utf-8"?>
<SoftwareInfo xmlns="http://schemeas.microsoft.com/windows/DeviceMetadata/SowftwareInfo/2007/11/">
  <DeviceCompanionApplication> ~411
    <Package>
      <Identity Name="1234abcd.MFTUtility" Publisher="CN=12345678-abcd-efgh-ijkl-123456189012" /> ~412
      <Applications>
      </Applications>
    </Package>
  </DeviceCompanionApplications>
</SoftwareInfo>
```

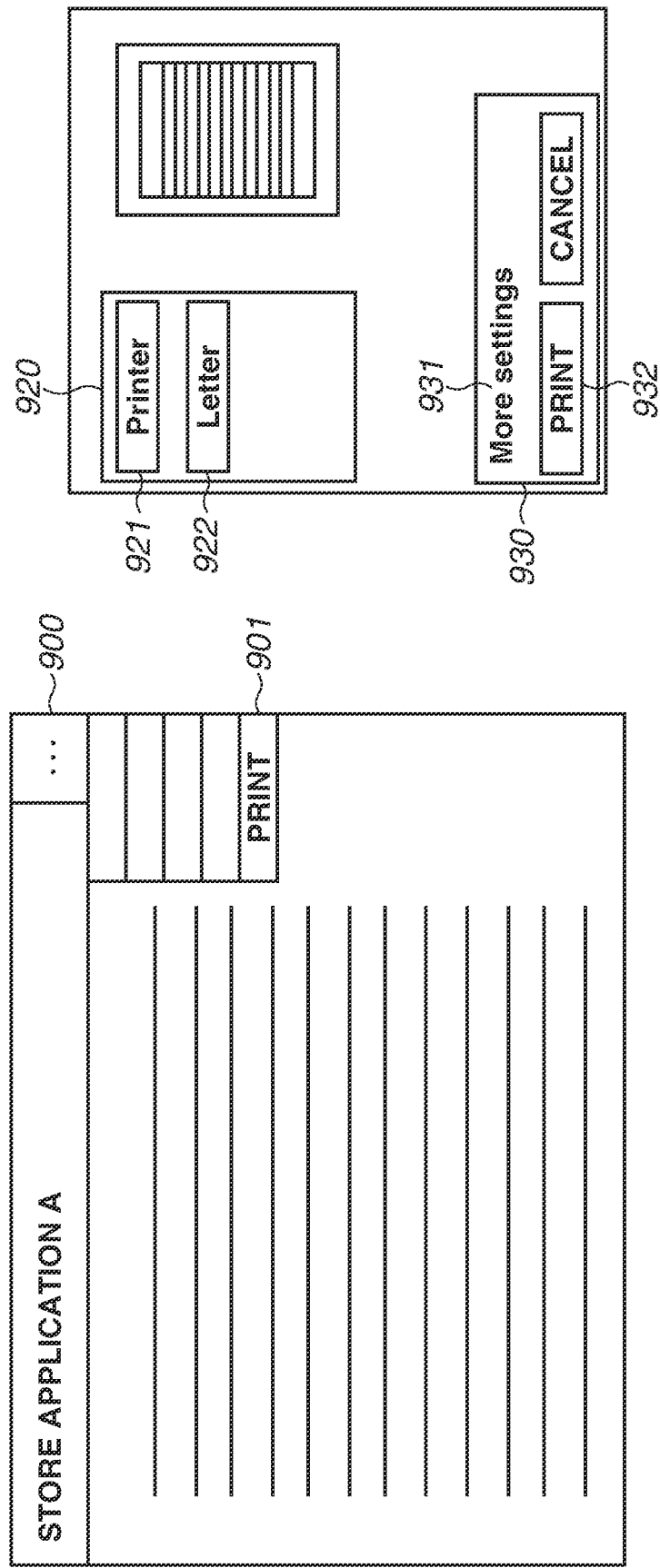

FIG.10

```
<psf:PrintTicket xmlns:psf="http://2003/08/printing/printschemaframework"
 xmlns:xsi="http://www.w3.org/2001/XMLSchema-instance"
 xmlns:xsd="http://www.w3.org/2001/XMLSchema"
 version="1"
 xmlns:ns0000="http://www.canon.com/ns/printschema/oip/v200"
 xmlns:psk="http://schemas.microsoft.com/windows/2003/08/printing/printschemakeywords"
 xmlns:pskv11="http://schemas.microsoft.com/windows/2013/05/printing/printschemakeywordsv11">
 ...
    <psf:Feature name="ns0000:JobSecurePrint">  ~1001
        <psf:Option name="ns0000:SecurePrint" />
    </psf:Feature>
    <psf:ParameterInit name="ns0000:JobSecurePrintPassword">  ~1002
        <psf:Value xsi:type="xsd:string">XXXXXX</psf:Value>
    </psf:ParameterInit>
 ...
</psf:PrintTicket>
```

FIG.11

```xml
<?xml version="1.0" encoding="UTF-8"?>
<psf:PrintCapabilities>
<psf:Feature name="ns0000:JobSecurePrint">
  <psf:Property name="psf:SelectionType">
    <psf:Value xsi:type="xsd:QName">psk:PickOne</psf:Value>
  </psf:Property>
  <psf:Property name="psk:DisplayName">
    <psf:Value xsi:type="xsd:string">AUTHENTICATION PRINT</psf:Value>
  </psf:Property>
  <psf:Option name="ns0000:None" constrained="psk:None">
    <psf:Property name="psk:DisplayName">
      <psf:Value xsi:type="xsd:string">OFF</psf:Value>
    </psf:Property>
  </psf:Option>
  <psf:Option name="ns0000:SecurePrint" constrained="psk:None">
    <psf:Property name="psk:DisplayName">
      <psf:Value xsi:type="xsd:string">ON</psf:Value>
    </psf:Property>
  </psf:Option>
</psf:Feature>
```

} 1101

STORAGE MEDIUM STORING AN APPLICATION PROGRAM

BACKGROUND

Field of the Disclosure

The present disclosure generally relates to a storage medium storing an application program for providing a print relevant graphical user interface (GUI).

Description of the Related Art

A generally known configuration transmits print data to a printing apparatus by using a printer driver. An operating system (OS) as basic software is installed in a host computer. A printer driver configured based on specifications defined by the OS operates when the printer driver is called from the OS. By providing a printer driver conforming to the specifications of the OS, a printing apparatus vendor can provide means for instructing a printer to perform printing, by using the OS. When using Windows 8 or an earlier version of Windows (a registered trade name) as an OS, the printer driver is configured by an architecture called V3 Printer Driver. A V3 Printer Driver can provide a function of displaying a GUI when a print request from a user is generated and prompt the user to perform a certain operation. For example, when a print request is generated, a predetermined event of a configuration module as a component of the V3 Printer Driver is called. In this way, the configuration module can display a user interface during its event processing. For example, Japanese Patent Application Laid-Open No. 2008-9901 discusses a printing control method for making an inquiry, in a case where a user is setting an unusable item, to a device about a reason why the item is unusable and displaying as a message the reason why the item is unusable.

In recent years, a new architecture called V4 Printer Driver for Windows has been released. Since security is emphasized in V4 Printer Drivers, a V4 Printer Driver provides lower customizability of the printer driver itself than a V3 Printer Driver. For example, the above-described configuration module is provided by an OS, and a vendor can provide only setting files and script files for customizing the operation of the configuration module. To compensate for the lowered customizability, a printing apparatus vendor can provide a dedicated application for assisting the function of the printer driver. This application is called Universal Windows Platform Device Apps (UWP Device Apps). UWP Device Apps can be provided with a function called Workflow (WF) for performing print relevant processing upon issuance of a predetermined user operation.

In the WF function, a thread without a user interface (UI), called a background task, is activated by the OS. The background task acquires a document subjected to print settings or printing and performs processing for customizing the printing. If the background task determines that a user input is required to perform processing for customizing the printing, the background task performs processing to display a UI.

However, there is a limitation on the execution of a background task. If the background task does not complete processing within a time period predetermined by the OS in a state where a UI is not displayed, the processing is aborted by the OS. This limitation on the execution of a background task is provided in order to prevent continuous execution of heavy processing which consumes a large amount of resources such as a computer battery and a network without the users recognition. Therefore, the background task for the WF function needs to determine whether to activate a UI within a predetermined time period.

By utilizing the WF function, the OS may instruct the background task to perform processing upon issuance of a print start instruction. For example, upon issuance of a print start instruction, the OS may instruct a background task to analyze a document subjected to print settings or printing, call a UI for performing a user operation as required, and prompt a user to perform confirmation processing.

However, in a case of a large-size document subjected to print settings or printing or in a case of a low-specification computer on which UWP Device Apps operates, processing for the WF function by the background task may possibly take time. Also, in a case where the computer is in a high-load state, for example, processing for the WF function by the background task may possibly take time.

For example, while the background task is performing processing for interpreting print data and determining whether to activate a UI, a time period predetermined by the OS may possibly elapse. In this case, there arises a situation in which the execution of the background task is forcibly aborted under task control by the OS and a print job is canceled.

SUMMARY OF THE DISCLOSURE

The present specification discloses a mechanism for preventing print processing from being aborted in a case where processing by a background task cannot be completed within a time period predetermined by an operating system (OS). The present specification also discloses a configuration for activating a foreground task for displaying a user interface (UI) based on a determination that determination processing cannot be completed within a predetermined time period, and determining whether a user input is required in the foreground task.

A storage medium storing a program disclosed in the present specification is a non-transitory computer readable storage medium storing a program with instructions for providing a graphical user interface (GUI) upon reception of a print instruction, the program including at least a component for executing a background task and a component for executing a foreground task, that when executed causes a computer to perform causing the operating system of the computer to activate the background task component which requests the OS to activate the foreground task component. When the foreground task is activated based on the request, the foreground task causes the computer to perform: acquiring a print ticket generated upon reception of the print instruction, displaying, as first display control, a GUI indicating that processing is in progress, determining whether to display a GUI for receiving a user operation based on the print ticket acquired by the acquisition, and notifying the OS of information indicating completion of the processing based on a determination not to display the UI for receiving the user operation.

Further features of the present disclosure will become apparent from the following description of exemplary embodiments with reference to the attached drawings.

BRIEF DESCRIPTION OF THE DRAWINGS

FIGS. 4A and 4B illustrate examples of metadata.

FIGS. 9A and 9B illustrate examples of screens displayed on the client computer.

FIG. 10 illustrates a print setting supplied to print data.

FIG. 11 illustrates capability information of the printer.

DESCRIPTION OF THE EMBODIMENTS

Figure 1:
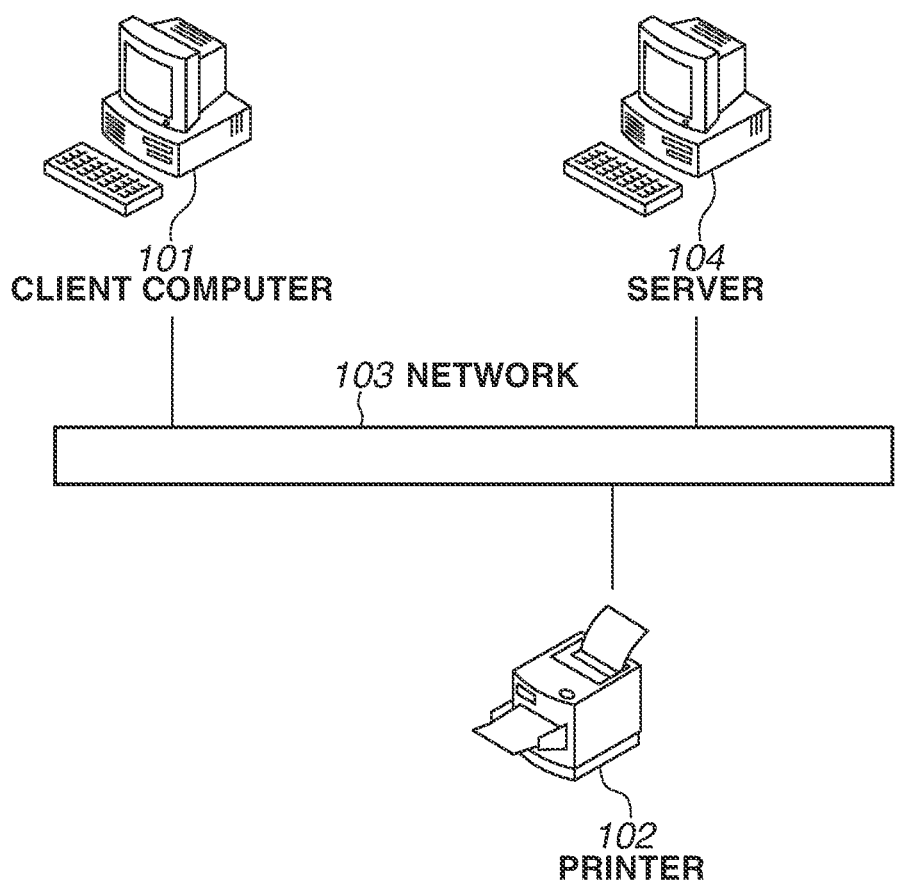
FIG. 1 illustrates an example of a printing system.

Exemplary embodiments of the present disclosure will be described below with reference to the accompanying drawings. The following exemplary embodiments do not limit the scope of the present disclosure as defined by the appended claims. Not all of the combinations of the features described in the exemplary embodiments are indispensable to the solutions for the present disclosure.

A first exemplary embodiment will be described below. The printing system illustrated in FIG. 1, includes a client computer 101 as an example of an information processing apparatus, a server 104 for distributing data to the client computer 101, and a printer 102 for receiving print data in the Page Description Language (PDL) format and performing printing. Each apparatus can communicate with each other via a network 103 including a Wide Area Network (WAN).

The printer 102 may be a single function printer having only a print function or a multifunction printer having a print function, a scanning function, and a copy function, for example. The number of client computers 101 is not limited to one for the network 103. A plurality of the client computers 101 may be connected to the network 103. The client computer 101 can transmit print data to the printer 102.

Figure 2:
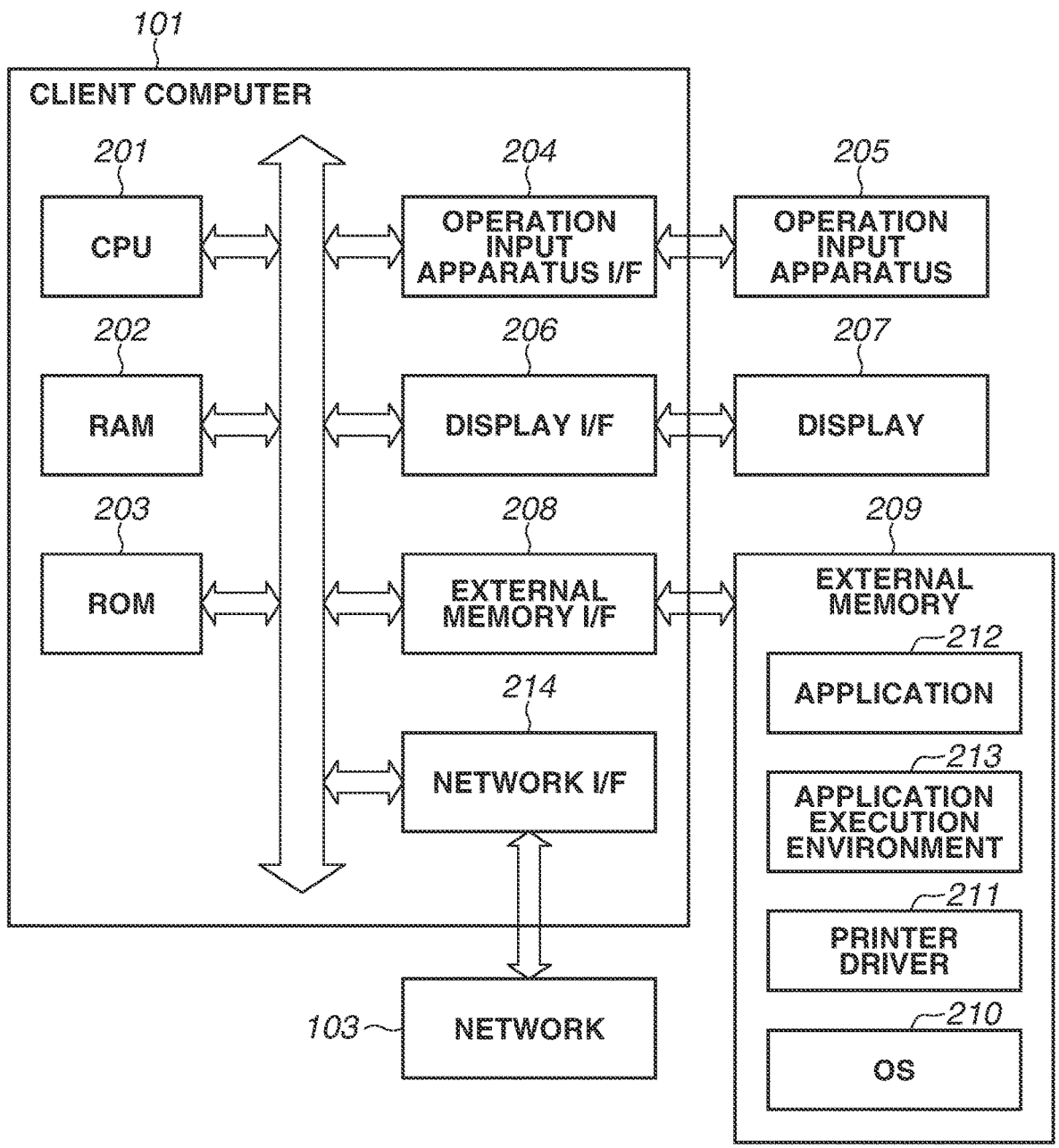
FIG. 2 illustrates an example of a hardware configuration of a client computer.

FIG. 2 is a block diagram illustrating a hardware configuration of the client computer 101 illustrated in FIG. 1. The client computer 101 includes a central processing unit (CPU) 201, a random access memory (RAM) 202, an external memory 209, and a read only memory (ROM) 203.

A control unit 200 including the CPU 201 controls operations of the entire client computer 101. The CPU 201 loads a program stored in the ROM 203 or the external memory 209 into the RAM 202 and executes the program to perform various control. More specifically, the CPU 201 controls a user interface (UI) screen, generates print data, and transmits print data. The ROM 203 stores a control program and a boot program executable by the CPU 201. The RAM 202 as the main memory of the CPU 201 is used as a work area or a temporary storage area for loading various programs. The external memory 209 connected to the control unit 200 via an external memory interface (I/F) 208 stores an operating system (OS) 210, an application 212, an application execution environment 213, and a printer driver 211.

Although, in the present exemplary embodiment, an auxiliary storage unit such as a hard disk drive (HDD) is assumed as the external memory 209, a nonvolatile memory such as a solid state drive (SSD) is also applicable instead of an HDD.

An operation input device I/F 204 is an interface for controlling an operation input apparatus 205 such as a keyboard, a pointing device (mouse), and a touch input device. The operation input apparatus 205 functions as a reception unit for receiving an operation from a user. A display I/F 206 controls screen display on a display 207. The display 207 functions as a display unit for displaying information to the user.

The control unit 200 is connected to the network 103 via a network I/F 214. The network I/F 214 transmits print data to a printer on the network 103 and receives an application and a printer driver from a server on the network 103. Data communication with an external terminal on the network 103 is, for example, a wireless communication conforming to the IEEE802.11 series, mobile communication such as Long Term Evolution (LTE) and 5th Generation (5G), and wired communication via a LAN cable.

Figure 3:
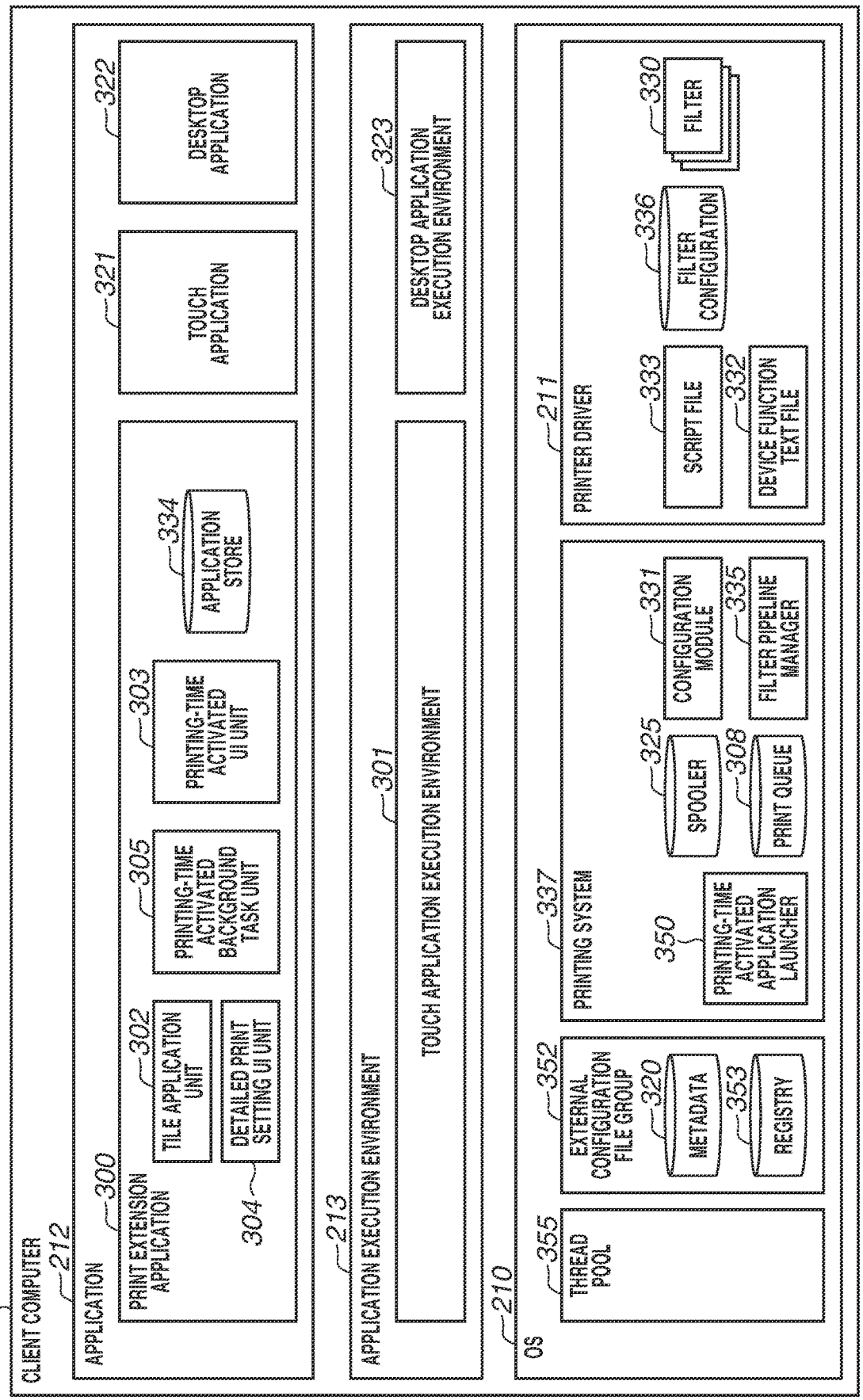
FIG. 3 illustrates an example of a software configuration of the client computer.

An example of a software configuration of the client computer 101 will be described below with reference to FIG. 3. Software in the client computer 101 is composed of three different layers: the OS 210, the application execution environment 213, and the application 212.

Each component of the OS 210 will be described below. The OS 210 includes a printing system 337, the printer driver 211, an external configuration file group 352, and a thread pool 355.

The external configuration file group 352 will be described below. Metadata 320, included in the external configuration file group 352, is definition information having identifiers of both a print extension application 300 and a print queue 308 and has a role of associating these identifiers. The metadata 320 will be described below with reference to FIGS. 4A and 4B.

A registry 353 is an area where a setting group of the OS 210 is described. A setting indicating whether to enable or disable the activation of the background task by a printing-time activated application launcher 350 is registered in the registry 353. Settings registered in the registry 353 can be changed via a setting screen of the OS 210.

Components of the printing system 337 will be described below. The print queue 308 is an area for temporarily storing a print job when performing printing by using a printer existing in the network 103. According to the present exemplary embodiment, the print queue 308 applicable to the printer 102 is generated.

A spooler 325 is a module for temporarily storing and managing an Extensible Markup Language (XML) Paper Specification (XPS) file as print target data printed from any one of the applications 212. After an XPS file stored in the spooler 325 is converted into a PDL file via a filter pipeline manager 335, the XPS file is transmitted to the printer 102 via the spooler 325.

The filter pipeline manager 335 is a module for loading one or more filters 330 and converting an XPS file into a PDL file. The filter pipeline manager 335 is configured as a part of the printing architecture (also referred to as a printing system) provided by the OS 210. The OS 210 reads one or more filters 330 as one of the components of the printer driver 211 based on the definition of the filter configuration 336 and generates a PDL file by using one or more filters 330. Examples of usable PDLs include Printer Control Language (PCL) and Laser beam printer Image Processing System (LIPS).

A configuration module 331 is a module for generating and changing a PrintTicket (also referred to as a print ticket). The module 331 has a prohibition function for preventing uncombinable settings from being made. The configuration module manages the PrintCapabilities document as capability information for a printer.

A detailed print setting UI unit 304, a printing-time activated background task unit 305, and a printing-time activated UI unit 303 of the print extension application 300 can call an application program interface (API) provided by the configuration module 331. By calling an API, each unit can acquire a PrintTicket in the Extensible Markup Language (XML) format and the PrintCapabilities document.

As the printer driver 211, a printer vendor offering V4 Printer Driver provides the OS 211 with a device function text file 332 and a script file 333 in which prohibition rules and device functions are described. Operations of the configuration module 331 are customized based on the files 332 and 333.

The printing-time activated application launcher 350 is a module for controlling execution of background tasks provided by the printing-time activated background task unit 305. When the OS 210 detects that a print start instruction is input by the user and performs printing, the printing-time activated application launcher 350 activates the printing-time activated background task unit 305. When a setting for disabling the activation of background tasks is stored in the registry 353, the OS 210 prevents the execution of background tasks.

The printer driver 211 includes the filter 330, the filter configuration 336, the script file 333, and the device function text file 332. The filter 330, a filter called by the filter pipeline manager 335, has a function of converting an input XPS file into a PDL file and outputting the PDL file. The filter configuration 336, a definition file referenced by the filter pipeline manager 335, describes the order of calling one or more filters 330. The script file 333 and the device function text file 332 which are called by the configuration module 331 enable customizing the operation of the configuration module 331.

The thread pool 355 is a module for storing a thread to be used when various applications 212 and a module group in the OS 210 are executed.

The application execution environment 213 includes a desktop application execution environment 323 and a touch application execution environment 301.

The touch application execution environment 301 is an execution environment for executing a touch application 321 and the print extension application 300 operating on the OS 210, as a kind of the application 212 (described below). The touch application execution environment 301, an execution environment for executing a Universal Windows Platform (UWP) application distributed from the server 104, controls the execution of a UWP application.

The desktop application execution environment 323 is an execution environment for executing a desktop application 322 as a kind of the application 212 (described below). The desktop application execution environment 323 controls execution of "Win32/64 application" and ".NET application".

The application 212 includes three different applications: the touch application 321, the print extension application 300, and the desktop application 322. The touch application 321 operates on the touch application execution environment 301. The touch application 321 is downloaded through an application distribution system disclosed on the Internet, and installed in the client computer 101. In the touch application 321, required module groups are packaged and signed to restrict API calls in the OS 210.

The print extension application 300, a kind of the touch application 321, operates on the touch application execution environment 301 like the touch application 321. The OS 210 acquires the print extension application 300 from an application distribution system via the Internet. The print extension application 300 according to the present exemplary embodiment has a function of displaying a uniquely customized UI at the time of printing, called Workflow (WF).

The print extension application 300 includes a tile application unit 302, the detailed print setting UI unit 304, the printing-time activated background task unit 305, and the printing-time activated UI unit 303.

The tile application unit 302, a UI unit executed upon reception of a user operation for activating the print extension application 300, provides functions such as status display of registered printers.

The detailed print setting UI unit 304, a UI unit executed upon reception of a detailed print setting event issued by the OS 210. The detailed print setting UI unit 304 generates and displays a print setting UI based on a PrintTicket and the PrintCapabilities document acquired from the configuration module 331 through an API. According to a user operation, the detailed print setting UI unit 304 suitably changes the setting of the PrintTicket and returns the setting to the configuration module 331.

The printing-time activated background task unit 305 is a component corresponding to a background task to be executed upon issuance of a print event. A task provided by the printing-time activated background task unit 305 has a limited survival time and is forcibly terminated by the OS 210 when a predetermined time period has elapsed.

The printing-time activated background task unit 305 can acquire, read, and write a PrintTicket through APIs of the configuration module 331. It is predetermined that, when using the WF function, the background task determines whether to activate the printing-time activated UI unit 303 and, when necessary, requests the OS 210 to activate the printing-time activated UI unit 303 as a foreground task component. The printing-time activated background task unit 305 can pass and receive values to/from the printing-time activated UI unit 303 by writing and reading changed values to/from the application store 334. When the printing-time activated background task unit 305 determines not to activate the printing-time activated UI unit 303, the printing-time activated application launcher 350 generates print data without activating the print extension application 300.

In addition, the printing-time activated UI unit 303 activated by the background task can edit XPS and PrintTicket settings as print target data and return these pieces of data to the OS 210.

When the background task requests the OS 210 to activate the printing-time activated UI unit 303, the OS 210 activates the printing-time activated UI unit 303. The printing-time activated UI unit 303 can acquire and change the PrintTicket and the PrintCapabilities settings, and also acquire the XPS file of the print target data. When changing the XPS file, it is necessary that the printing-time activated UI unit 303 once passes the edited XPS file to the printing-time activated background task unit 305 through the application store 334, and the printing-time activated background task unit 305 returns the edited XPS file to the OS 210. According to the present exemplary embodiment, the printing-time activated UI unit 303 displays a UI for performing confirmation about printing and a UI for prompting the user to input or change settings.

A relation between printers and the print extension application 300 will be described below with reference to FIGS. 4A and 4B.

FIG. 4A illustrates an example of a description indicating applicable device information in the metadata 320 for associating printers with the print extension application 300. A HardwareIDList tag 402 indicating a list of printers using the metadata 320 is described in the metadata 320. An item 403 indicates that a printer having Hardware ID "MFP1_abcd" uses the metadata 320. Likewise, an item 404 indicates that a printer having Hardware ID "MFP2_ijkl" uses the metadata 320. In this way, a plurality of printers using the metadata 320 can be enumerated in one piece of the metadata 320. Although, in an example case according to the present exemplary embodiment, Hardware IDs of two different printers are specified in the metadata 320, the present exemplary embodiment is not limited thereto. One or more printers may be specified. Hardware ID is identification information, returned from a printer, for uniquely identifying the printer.

FIG. 4B illustrates a DeviceCompanionApplications tag 411 indicating the print extension application 300. Item 412 indicates identification information for identifying a printer vendor and indicates that the print extension application 300 named "1234abcd.MFPUtility" which can be provided for printers of the printer vendor.

When the printer 102 is connected to the client computer 101, the OS 210 makes an inquiry to a metadata server based on Hardware ID acquired from the printer 102. The metadata server searches for registered metadata and returns a response for applicable metadata. The OS 210 stores the metadata 320 based on the response. The OS 210 further acquires the print extension application 300 described in the DeviceCompanionApplications tag 411 in the stored metadata 320 from an application distribution server. Then, the OS 210 installs the print extension application 300 in the external memory 209 and associates the application with the printer 102. Thus, when a print request to the printer 102 occurs via the printer driver 211, the print extension application 300 can be activated. A printer vendor provides the metadata 320 in advance to the metadata server. When installing V4 Printer Driver 211, the client computer 101 accesses the metadata server and automatically installs the print extension application 300 most suitable for the driver to be installed.

Figure 5:
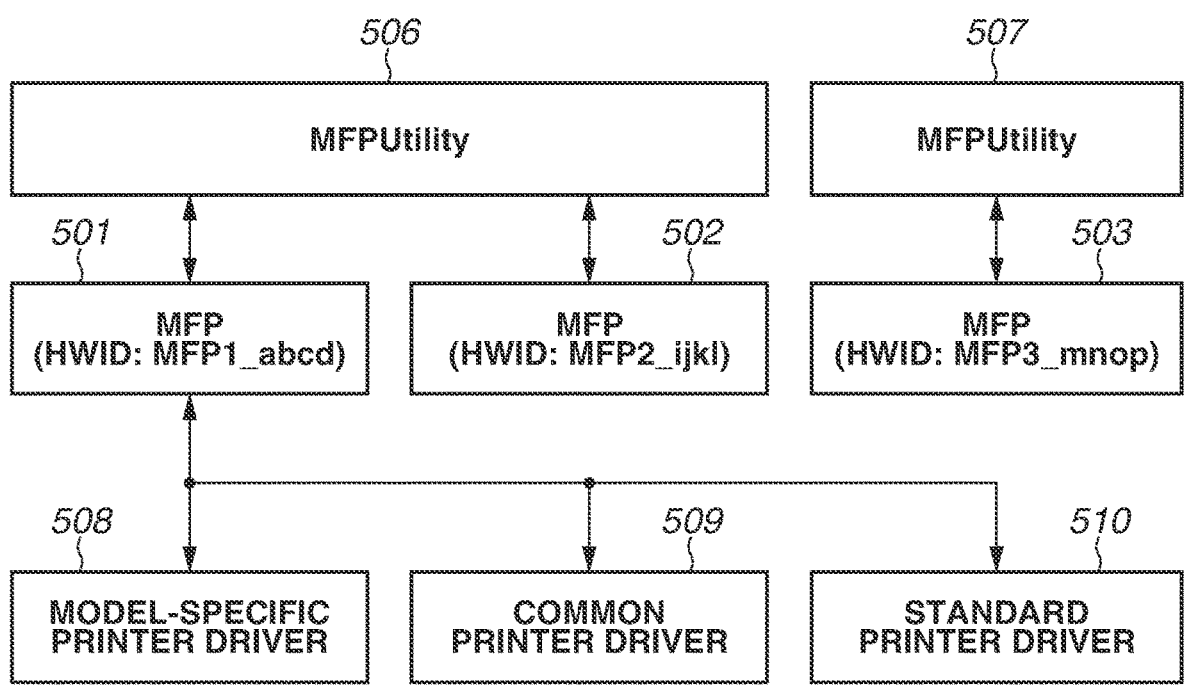
FIG. 5 schematically illustrates a relationship between a driver, an extension application, and a printer.

FIG. 5 illustrates an example of a printing environment. A multifunction peripheral (MFP) 501, which is a printer, has Hardware ID "MFP1_abcd". When connecting the MFP 501 to the client computer 101 and installing the printer driver applicable to the MFP 501, the OS 210 acquires the metadata 320 applicable to the connected printer. Based on the metadata 320, the OS 210 acquires the print extension application 300 named "MFPUtility 506" and associates the print extension application 300 with the MFP 501. There is a plurality of different printer drivers for transmitting print data to a single printer (for example, the MFP 501). More specifically, a plurality of printer drivers may be installed as printer drivers applicable to the MFP 501, which is one device. A model-specific printer driver 508 is a printer driver dedicated for the MFP 501 provided by a printer vendor. A common printer driver 509 provided by a printer vendor is capable of processing a plurality of different printers 102 of the printer vendor. A standard printer driver 510, a class driver which can be commonly utilized for printing apparatuses provided by a plurality of vendors, is provided by the OS 210. The standard printer driver 510 can process a wide range of printers by utilizing a standardized printing method.

The OS 210 automatically selects and installs the latest printer driver having the highest function among the printer drivers available. A printer driver includes information for identifying an apparatus, called Hardware ID and Compatible ID. When a printer is connected to the client computer 101, the OS 210 acquires identification (ID) information from the printer and searches for and installs a printer driver having the applicable ID.

By providing the metadata 320 described above with reference to FIGS. 4A and 4B, a printer vendor providing printers can control which print extension application 300 is to be provided to each printer. For example, the printer vendor can provide one common print extension application 300 for a plurality of printers or provide different types of print extension applications 300 according to the type of the printer.

For example, according to the present exemplary embodiment, an MFP 502 is to be registered as an additional printer using MFPUtility 506. According to the present exemplary embodiment, MFPUtility 507 is to be supported as the print extension application 300 to be used when printing is made on the MFP 503.

The present exemplary embodiment will be described below centering on an example case where the MFP 501 is a printer corresponding to the printer 102, and MFPUtility 506 is the print extension application 300 (UWP Device Apps) associated with the printer 102. The following description will be made on the premise that the model-specific printer driver 508 is the V4 Printer Driver to be used for printing.

The printer 102 according to the present exemplary embodiment has an authentication print function (also referred to as a secure print function). According to the present exemplary embodiment, when using the authentication print function such as a PIN print function, the printer driver transmits a print job applied with authentication information (PIN code, a password, etc.) set in the PrintTicket by the user, to the printer 102. The printer 102 that received the print job including the authentication information is controlled not to perform printing until the authentication information is input to the operation unit of the printing apparatus.

Functions included in the printer 102 represented by authentication print are described in the device function text file 332 of the printer driver 211. When the print extension application 300 receives the PrintCapabilities document generated by the configuration module 331 based on the device function text file 332, the print extension application 300 grasps the functions included in the printer 102. The user can input authentication information through a print setting screen displayed by the printer driver 508 in cooperation with the OS 210.

As a function that utilizes the WF function, the print extension application 300 has a function of prompting the user to confirm and input authentication information upon input of a print start instruction.

As described above, it is predetermined that a background task is to be activated when the WF function is activated. However, there is a limitation on the execution of a background task. If the background task does not complete processing within a time period predetermined by the OS 210 in a state where no UI is displayed, the processing is aborted by the OS 210. This limitation on the execution of a background task is provided in order to prevent continuous execution of heavy processing which consumes a large amount of resources such as a computer battery and a network without user's recognition. Therefore, the background task for the WF function needs to determine whether to activate a UI within a predetermined time period.

However, in a case of a large-size document subjected to print setting or printing or in a case of a low-specification computer on which UWP Device Apps operates, processing for the WF function by a background task may possibly take time. Also, in a case where a computer is in a high-load state, for example, processing for the WF function by a background task may possibly take time. For example, while the background task is performing processing for interpreting print data and determining whether to activate a UI, a time period predetermined by the OS may possibly elapse. In this case, there arises a problem that the execution of the background task is forcibly aborted under task control by the OS 210 and a print job is canceled.

The present exemplary embodiment will be described below centering on a mechanism devised in view of the above-described problem, i.e., a mechanism for preventing print processing from being aborted in a case where processing by the background task cannot be completed within a time period predetermined by the OS 210. More specifically, the following describes a mechanism for controlling a UI display for calling the printing-time activated UI unit 303, which is a constant foreground task, when the printing-time activated background task unit 305 as a component for executing a background task is called by the OS 210.

The PrintCapabilities document and the PrintTicket will be described below. FIG. 11 illustrates an example of the PrintCapabilities document generated based on the device function text file 332 stored by the printer driver 211 to be used for printing.

The PrintCapabilities document has a plurality of Options in one Feature. Feature indicates settable functions. Option in Feature indicates an option. Information 1101 illustrated in FIG. 11 indicates examples of Feature and Option for authentication print. The information 1101 defines that ns0000:SecurePrint and ns0000:None are selectable as Options for the Feature of JobSecurePrint.

The PrintTicket in which authentication print is set will be described below with reference to FIG. 10. Either one of the setting values defined in the PrintCapabilities document is stored in the PrintTicket as the current print setting.

Information 1001 indicates that the authentication print function is set. This function prompts the user to input a password at the time of printing. Since the Option tag included in the Feature of JobSecurePrint is ns0000:SecurePrint, the information 1001 indicates that authentication print is set to ON. When authentication print is not set to ON, ns0000:None is set to the Option tag.

The element of psf:Parameterinit in information 1002 indicates the value of a text input. FIG. 10 illustrates an example case where a password "XXXXXX" is set for authentication print via the print setting screen. If a password is not set via the print setting screen, the configuration module 331 generates the PrintTicket not including the element of psf:Parameterinit.

Printing using the printer 102 will be described below with reference to FIGS. 9A and 9B. Although, in the example case according to the present exemplary embodiment, printing is performed from the touch application 321, which is a UWP application, the present exemplary embodiment is not limited thereto. Printing can also be performed from the desktop application 322.

FIG. 9A is an example screen displayed on the display 207 by the touch application 321. The touch application 321 includes an area for displaying the content. A menu key 900 is a key for displaying a menu. FIG. 9A illustrates an example case where the menu is displayed. The menu displays a plurality of options allowing the user to select a print key 901 from the menu.

Upon detection of the selection of the print key 901, the touch application 321 requests the OS 210 to display a print dialog.

FIG. 9B illustrates an example of a print dialog displayed by the OS 210. The print dialog performs simplified print setting displayed by the OS 210. The print dialog includes an item 920 for print settings and an item 930 for print instructions. The user can perform simplified print setting by selecting the item 920.

The OS 210 acquires the PrintTicket set to the print queue 308 corresponding to the printer driver set as a normally used printer from the configuration module 331 and displays the PrintTicket settings on the print dialog.

An item 921 displays the name of the printer driver currently selected. The user can change the printer driver to be used by selecting the item 921. An item 922 is an example of a print setting.

An item 931 is a display item used to call the detailed print setting UI unit 304 provided by the print extension application 300. An item 932 is a display item used to start printing based on the content provided by the touch application 321.

Upon detection of the depression of the item 932 displayed in the print dialog, the OS 210 generates a print event. After a print event is generated, the touch application 321 generates an XPS file based on a print target content (also referred to as a print content) in cooperation with the OS 210, and then proceeds to the print processing in the flowchart illustrated in FIG. 6.

A specific control method in the print processing will be described below with reference to the flowcharts illustrated in FIGS. 6 and 7.

Figure 6:
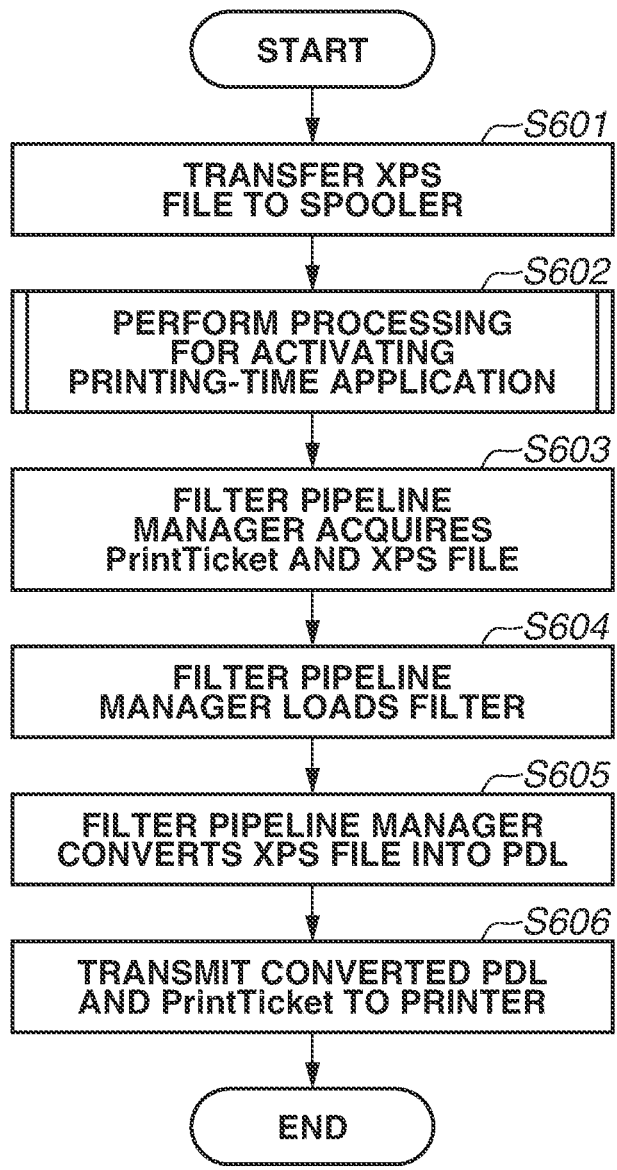
FIG. 6 is a flowchart illustrating an example of control by the client computer.
Figure 7:
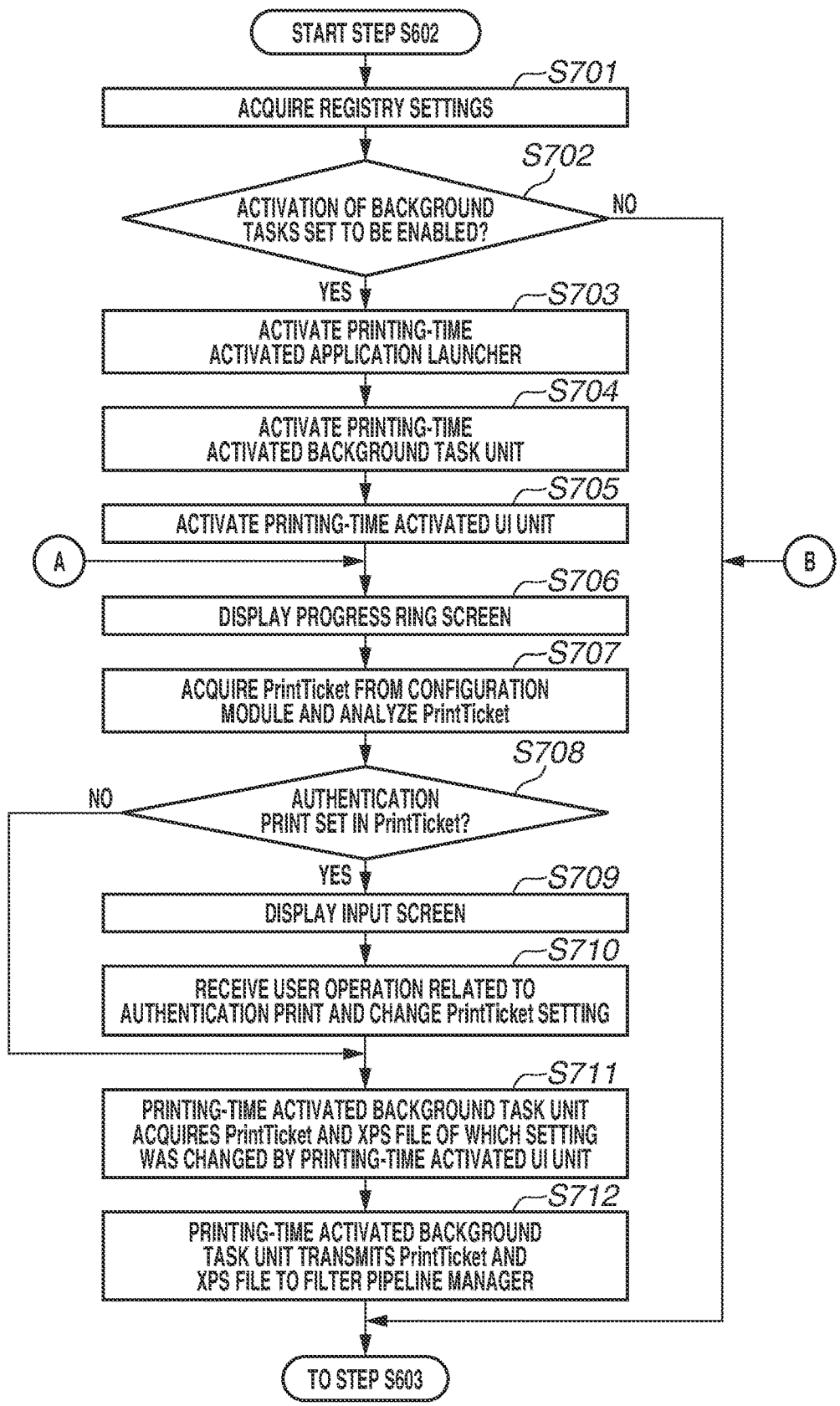
FIG. 7 is a flowchart illustrating an example of control by the client computer.

Each operation (step) illustrated in the flowcharts illustrated in FIGS. 6 and 7 is implemented when the CPU 201 reads a program for implementing each module, component, and application stored in the external memory 209 into the RAM 202 and then executes the program. In the descriptions of control provided by each control module, component, and application, each unit implemented by the CPU 201 will be described as a subject. Display, reception of a user operation, data transmission and reception, and some other pieces of processing are implemented through the cooperation of the CPU 201, I/Fs, and input/output devices connected to the I/Fs.

The flowchart illustrated in FIG. 6 is executed upon generation of a print event. A print event may be generated by the touch application 321 or the desktop application 322.

In step S601, the OS 210 transmits an XPS file generated in cooperation with the application 212 which generated the print event to the spooler 325. Upon completion of XPS file transmission, the processing proceeds to step S602.

In step S602, the OS 210 performs processing for activating the WF function. This processing will be described in detail below with reference to FIG. 7. Upon completion of a series of processing steps related to the processing for activating the WF function, the processing proceeds to step S603.

In step S603, the filter pipeline manager 335 of the OS 210 acquires the PrintTicket and the XPS file from the spooler 325.

In step S604, based on the definition of the filter configuration 336, the filter pipeline manager 335 reads the filter 330 applicable to the printer driver to be used for printing from the external memory 209 to load the filter 330 into the RAM 202.

In step S605, the filter pipeline manager 335 inputs the XPS file into the loaded filter 330 to cause the filter 330 to perform conversion processing. The conversion processing may be performed by using a plurality of filters. The filter pipeline manager 335 transmits a PDL file, obtained as a result of conversion, to the spooler 325.

In step S606, the spooler 325 transmits a print job including the converted PDL file and the PrintTicket to the printer 102 in cooperation with the network I/F 214. Upon reception of the print job the printer 102 performs print processing based on the print job.

The processing for activating the WF function performed in step S602 will be specifically described below with reference to FIG. 7.

In step S701, the OS 210 reads the settings of the registry 353. When the setting for enabling the activation of background tasks is not stored in the registry 353, i.e., when the setting for disabling the activation thereof is stored (NO in step S702), the OS 210 skips the processing for activating the WF function, and the processing proceeds to step S603 and subsequent steps. On the other hand, when the setting for enabling the activation of background tasks is stored in the registry 353 (YES in step S702), the processing proceeds to step S703.

In step S703, the OS 210 activates the printing-time activated application launcher 350. In step S704, the printing-time activated application launcher 350 requests the OS 210 to activate the printing-time activated background task unit 305 as a component of the print extension application 300. More specifically, the printing-time activated application launcher 350 identifies a print queue based on the printer driver to be used for printing. Then, in cooperation with the touch application execution environment 301, the printing-time activated application launcher 350 performs control to activate the component for executing the background task of the UWP Device Apps associated with the identified print queue. According to the present exemplary embodiment, the component of the printing-time activated background task unit 305 of the print extension application 300 is to be activated.

In step S705, the printing-time activated background task unit 305 request the OS 210 to activate the component of the printing-time activated UI unit 303 as a foreground task. Upon reception of the request, the OS 210 assigns the printing-time activated UI unit 303 provided by the print extension application 300 as a thread in the thread pool 355 to enable the printing-time activated UI unit 303 to display a screen on the display 207. The printing-time activated UI unit 303 acquires a delay object in order to continue communication with the user.

Figure 8A:
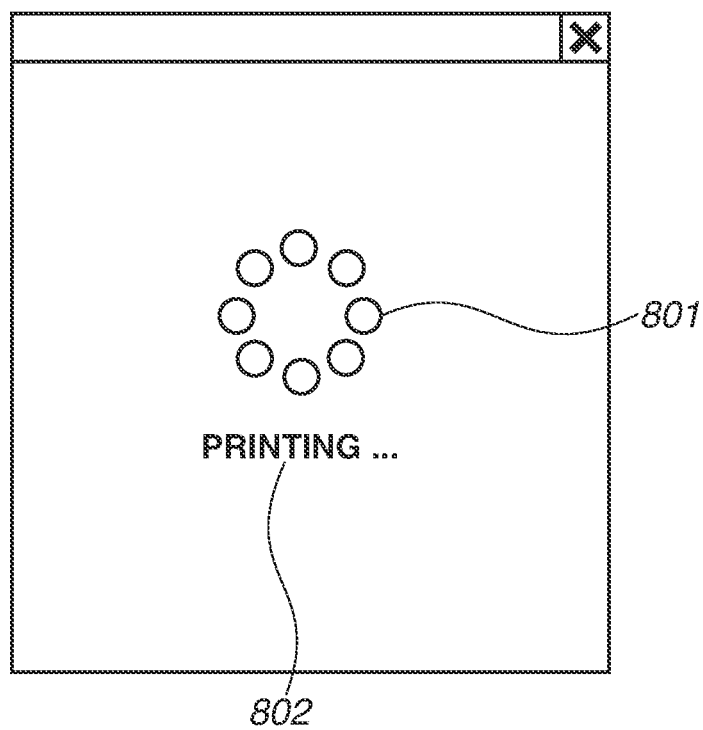
FIGS. 8A and 8B illustrate examples of screens displayed on the client computer.
Figure 8B:
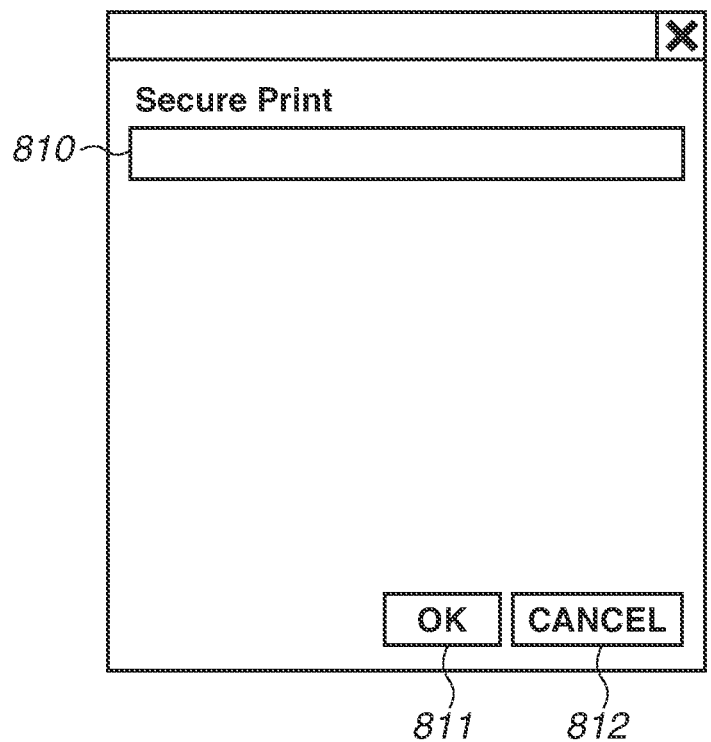

In step S706, the printing-time activated UI unit 303 displays a progress screen on the display 207. FIGS. 8A and 8B illustrate examples of screens displayed on the display 207 by the printing-time activated UI unit 303. FIG. 8A illustrates an example of a progress screen for displaying a progress ring 801. The printing-time activated UI unit 303 displays a rotating progress ring to notify the user that the processing is in progress. The printing-time activated UI unit 303 also displays a character string 802 such as "Printing . . ." to notify the user that print processing is in progress.

Referring back to the flowchart illustrated in FIG. 7, in step S707, the printing-time activated UI unit 303 requests the OS 210 to activate an analysis thread to be asynchronously executed with the UI thread. The OS 210 assigns the analysis thread in the thread pool 355. The analysis thread acquires the PrintTicket from the configuration module 331 and tentatively analyzes the PrintTicket acquired. Although, in the example case according to the present exemplary embodiment, analysis processing and UI control processing are controlled by different threads, the present exemplary embodiment is not limited thereto.

In step S708, the printing-time activated UI unit 303 determines whether authentication print is set in the PrintTicket, based on the result of the tentative analysis processing on the PrintTicket in step S707. When the printing-time activated UI unit 303 does not determine that authentication print is set as a result of the analysis processing (NO in step S708), the processing proceeds to step S711. On the other hand, when the printing-time activated UI unit 303 determines that authentication print is set as a result of the analysis processing (YES in step S708), the processing proceeds to step S709.

In step S709, the UI thread of the printing-time activated UI unit 303 displays an input screen on the display 207. FIG. 8B illustrates an example of an input screen. An area 810 indicates a text box for inputting authentication information. The user inputs a password or PIN code in the area 810. An OK button 811 is used to apply the authentication information input in the area 810 upon reception of an operation event such as a click. The OK button 811 may be displayed in a grayout state until authentication information is input in an area 810. A Cancel button 812 is used to cancel printing. When the Cancel button 812 is pressed, the execution of the print job is aborted.

Referring back to the flowchart illustrated in FIG. 7, in step S710, the UI thread of the printing-time activated UI unit 303 receives a user operation and changes the setting of the PrintTicket based on the user operation. More specifically, the UI thread updates the information 1002 illustrated in FIG. 10 based on the input authentication information. If an attribute equivalent to the information 1002 is not present, the UI thread adds the attribute to the PrintTicket.

The printing-time activated UI unit 303 also calls a method for releasing the delay object in order to notify the OS 210 that communication with the user is completed. When the delay object is released and the processing for terminating the foreground task is completed, the subject of the processing changes to the background task.

In step S711, the printing-time activated background task unit 305 acquires the PrintTicket and the XPS file of which setting was changed by the printing-time activated UI unit 303.

In step S712, the printing-time activated background task unit 305 transmits the PrintTicket and the XPS file to the filter pipeline manager 335 to complete processing related to the WF function.

When the OS 210 does not determine that the setting for enabling the activation of background tasks is stored (NO in step S702), the PrintTicket acquired from the module 331 and the XPS file generated according to the print instruction are to be transmitted to the filter pipeline manager 335.

According to the above-described exemplary embodiment, when the printing-time activated background task unit 305 as a component configuring a background task is called by the OS 210, the OS 210 calls the printing-time activated UI unit 303 as a foreground task to enable displaying a UI. Therefore, after the printing-time activated UI unit 303, which is a foreground task, acquires a delay object, the PrintTicket can be analyzed by the printing-time activated UI unit 303. This makes it possible to prevent print processing from being aborted in a case where processing by the background task cannot be completed in time. After the printing-time activated UI unit 303 is called, a UI such as a progress ring is displayed to indicate that processing is in progress. This makes it possible to notify the user that processing is in progress in a recognizable way.

The first exemplary embodiment has been described above centering on a mechanism for preventing a print job from being aborted due to the execution of the WF function by committing the analysis of the PrintTicket to a foreground task. A second exemplary embodiment focuses on a case where the printing-time activated background task unit 305 can determine whether to activate a UI. A mechanism for improving the performance at the time of printing by not activating a UI in such a case where the printing-time activated background task unit 305 can determine whether to activate a UI will be described.

More specifically, according to the second exemplary embodiment, the printing-time activated background task unit 305 analyzes the PrintTicket to determine the necessity of activating a UI. A mechanism for performing control to activate a foreground task when the printing-time activated background task unit 305 measures the execution time and determines that processing cannot be completed will be described.

The hardware and software configurations of the second exemplary embodiment are similar to those of the first exemplary embodiment, and redundant descriptions thereof will be omitted.

Figure 12:
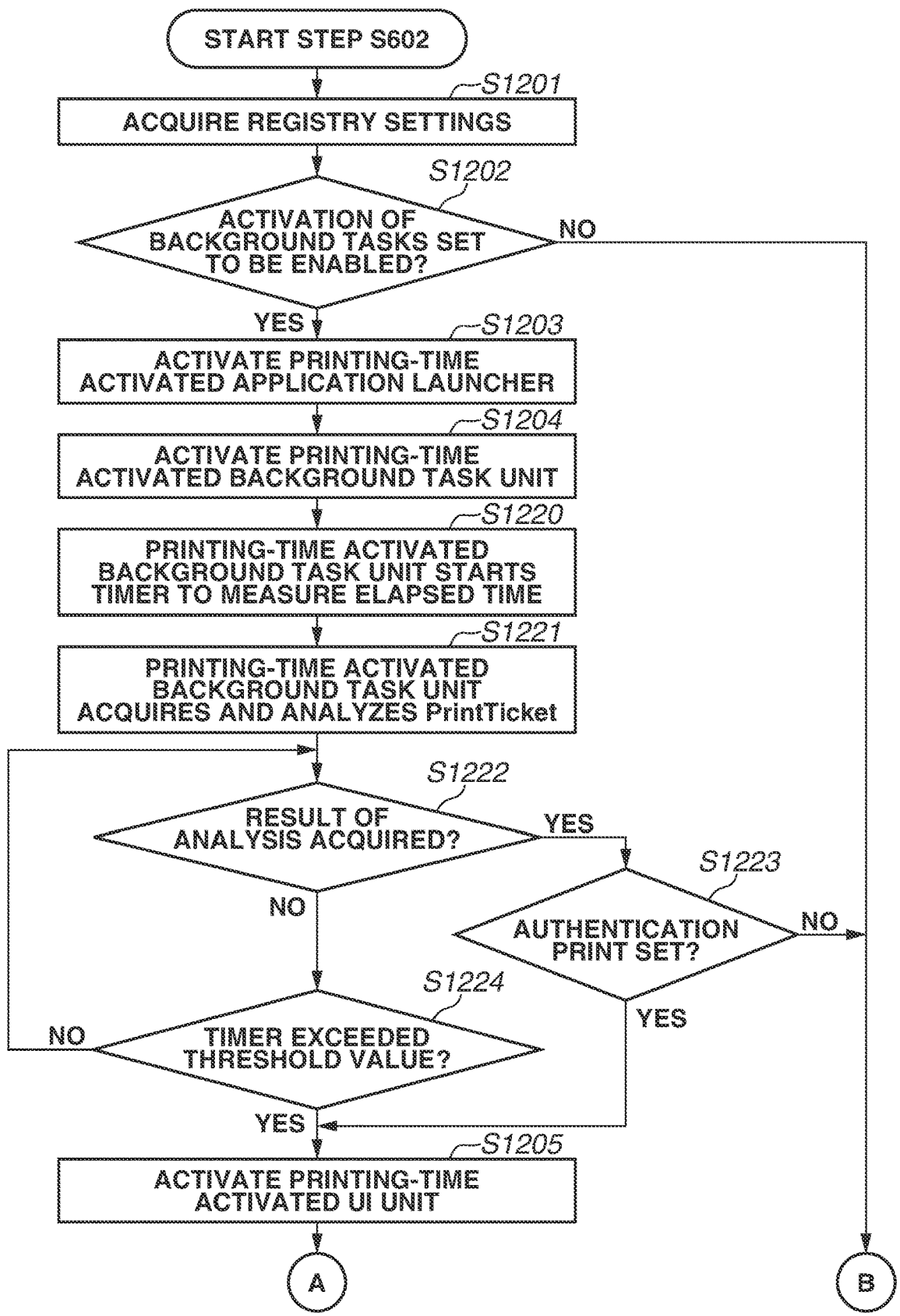
FIG. 12 is a flowchart illustrating an example of control by the client computer.

A specific control method will be descried below with reference to the flowchart illustrated in FIG. 12. The flowchart illustrated in FIG. 12 describes processing to be performed in place of the processing of the flowchart illustrated in FIG. 7 according to the first exemplary embodiment. This flowchart illustrated in FIG. 12 differs from the flowchart illustrated in FIG. 7 in that processing in steps S1220 to S1224 is added after the processing for activating a background task.

Processing in steps S1201 to S1204 is similar to the processing in steps S701 to S704, respectively, and redundant descriptions thereof will be omitted. When a background task is activated in step S1204, the processing proceeds to step S1220.

In step S1220, the printing-time activated background task unit 305 activates the timer to start counting the elapsed time. In step S1221, the printing-time activated background task unit 305 acquires the PrintTicket from the configuration module 331 and analyzes the PrintTicket. The analysis processing in step S1221 is to be asynchronously performed with the time count.

In step S1222, the printing-time activated background task unit 305 determines whether a result of the analysis performed in step S1221 was obtained. When a result of the analysis performed in step S1221 was obtained (YES in step S1222), the processing proceeds to step S1223. On the other hand, when a result of the analysis performed in step S1221 was not obtained (NO in step S1222), the processing proceeds to step S1224. In step S1223, the printing-time activated background task unit 305 determines whether authentication print is set in the PrintTicket based on the result of the analysis in step S1221. When authentication print is set (YES in step S1223), the processing proceeds to step S1205. On the other hand, when authentication print is not set (NO in step S1223), the printing-time activated background task unit 305 ends processing, and the processing proceeds to step S603 and subsequent steps (data conversion and transmission processing). Processing in step S1205 is similar to the processing in step S705 according to the first exemplary embodiment, and redundant description thereof will be omitted. Upon completion of the processing in step S1205, the processing proceeds to step S706 and subsequent steps (processing by the foreground task) according to the first exemplary embodiment.

In step S1224, the printing-time activated background task unit 305 determines whether the count time of the timer exceeds a predetermined threshold value internally stored. When the count time of the timer exceeds the predetermined threshold value internally stored (YES in step S1224), the processing proceeds to step S1205. On the other hand, when the count time of the timer does not exceed the predetermined threshold value internally stored (NO in step S1224), the processing returns to step S1222, and the printing-time activated background task unit 305 waits for a result of the analysis. A suitable predetermined threshold value is to be set so that a foreground task can be activated before the limitation on the execution by a background task is reached.

When a determination can be completed within the time limitation of a background task, the determination can be performed by the background task, thus improving the performance of printing.

A third exemplary embodiment will be described below centering on a case where the function equivalent to the timer counting performed within a background task according to the second exemplary embodiment is performed by the OS 210. The present exemplary embodiment is configured to issue a timeout exception before the OS 210 forcibly terminates the background task. The printing-time activated background task unit 305 is configured to activate the printing-time activated UI unit 303 as exception handling upon detection of a throw of a timeout exception event.

The hardware and software configurations of the third exemplary embodiment are similar to those of the first exemplary embodiment, and redundant descriptions thereof will be omitted.

An issuance of an exception by the OS 210 will be described blow. If a printing event occurs, the OS 210 generates a process of the print extension application 300 and generates a thread of the printing-time activated background task unit 305. After the generation of the thread, the OS 210 enables the background task to perform processing. The OS 210 manages the execution time of the generated thread. When a predetermined time period has elapsed since the thread was generated, the OS 210 throws a timeout exception to the thread. According to the present exemplary embodiment, when the printing-time activated background task unit 305 detects the throwing of the exception, the OS 210 performs control to activate a foreground task.

Figure 13:
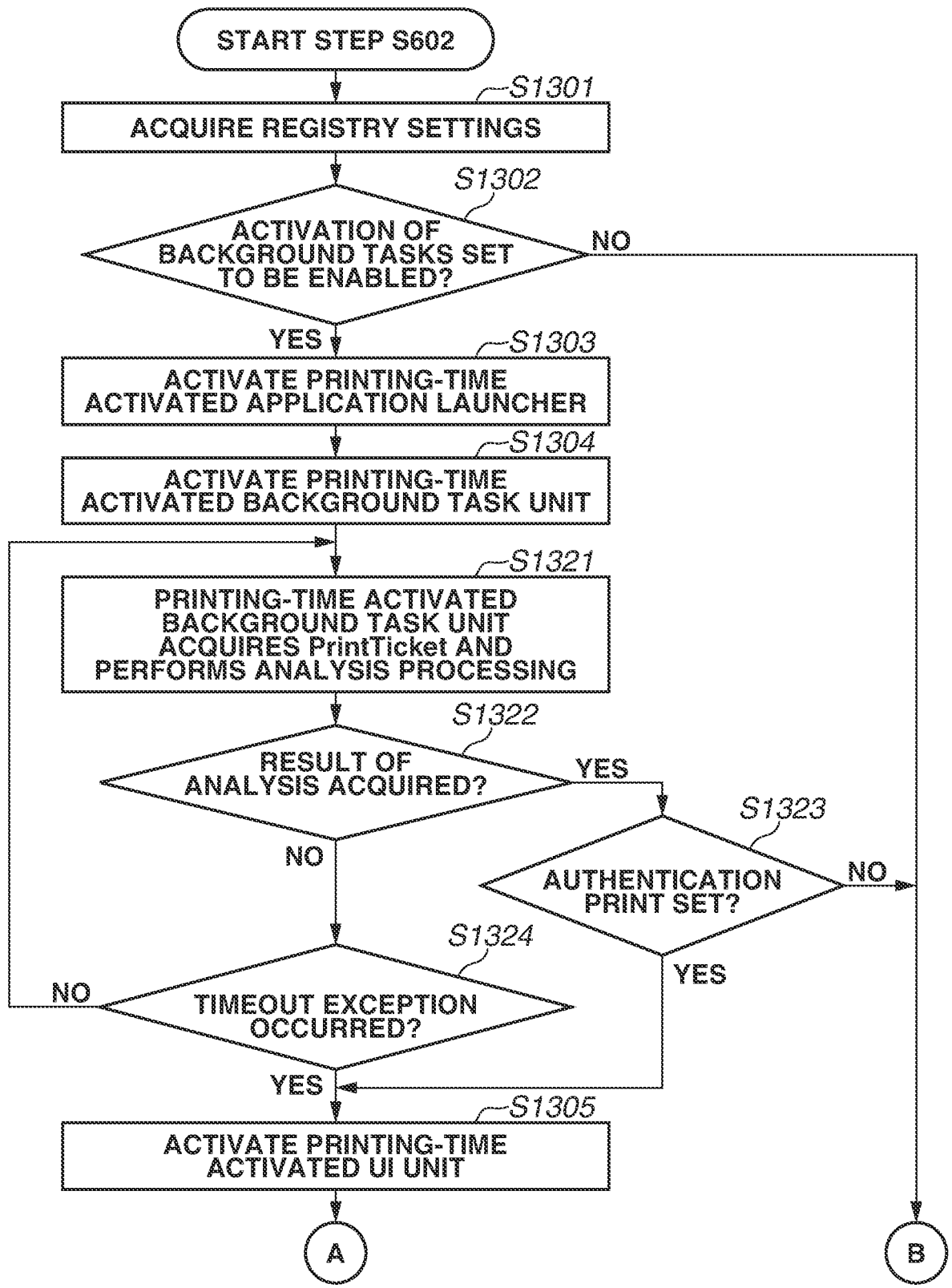
FIG. 13 is a flowchart illustrating an example of control by the client computer.

A specific control method will be described below with reference to the flowchart illustrated in FIG. 13. The flowchart illustrated in FIG. 13 describes processing to be performed in place of the processing of the flowchart illustrated in FIG. 7 according to the first exemplary embodiment. This flowchart illustrated in FIG. 13 differs from the flowchart illustrated in FIG. 7 in that processing in steps S1321 to S1324 is added after the processing for activating a background task.

Processing in steps S1301 to S1304 is similar to the processing in step S701 to S704, respectively, according to the first exemplary embodiment, and redundant descriptions thereof will be omitted. When a background task is activated in step S1304, the processing proceeds to step S1321.

In step S1321, the printing-time activated background task unit 305 acquires the PrintTicket from the configuration module 331 and analyzes the PrintTicket.

In step S1322, the printing-time activated background task unit 305 determines whether a result of the analysis performed in step S1321 was obtained. When a result of the analysis performed in step S1321 is obtained (YES in step S1322), the processing proceeds to step S1323. On the other hand, when a result of the analysis performed in step S1321 is not obtained (NO in step S1322), the processing proceeds to step S1324. In step S1323, the printing-time activated background task unit 305 determines whether authentication print is set in the PrintTicket based on the result of the analysis in step S1321. When authentication print is set (YES in step S1323), the processing proceeds to step S1305. On the other hand, when authentication print is not set (NO in step S1323), the printing-time activated background task unit 305 ends processing, and the processing proceeds to step S603 and subsequent steps (data conversion and transmission processing). Processing in step S1305 is similar to the processing in step S705 according to the first exemplary embodiment, and redundant description thereof will be omitted. Upon completion of the processing in step S1305, the processing proceeds to step S706 and subsequent steps (processing by the foreground task) according to the first exemplary embodiment.

In step S1324, the printing-time activated background task unit 305 determines whether a timeout exception was received from the OS 210. When the printing-time activated background task unit 305 receives a timeout exception (YES in step S1324), the processing proceeds to step S1305. On the other hand, when the printing-time activated background task unit 305 did not receive a timeout exception (NO in step S1324), the processing returns to step S1321, and the printing-time activated background task unit 305 continues the analysis and determination processing by the background task.

As described above, according to the present exemplary embodiment, the OS 210 issues a timeout exception to the background task before the OS 210 forcibly terminates the thread of the background task. Upon reception of the timeout exception, the background task activates a foreground task and acquires a delay object. This processing enables the thread assigned for the background task to use calculation resources only to analyze the Print Ticket and determine whether to activate a UI, thus improving the calculation performance.

Other Exemplary Embodiments

Although the present exemplary embodiment has been described above centering on a screen for inputting authentication information for authentication print as an example of a UI displayed by the WF function, the present exemplary embodiment is not limited thereto. For example, a print preview may be displayed as a UI to be displayed after reception of a print instruction. Although, in the present exemplary embodiment, a V4 Printer Driver is used as the printer driver, the present exemplary embodiment is also applicable to a V4 FAX Driver. For example, when the present exemplary embodiment is applied to a V4 FAX Driver, a screen for inputting and confirming a destination address may be displayed by using the WF function.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-089461, filed May 7, 2018, which is hereby incorporated by reference herein in its entirety.

What is claimed is:

1. A non-transitory computer-readable storage medium storing an application program including a background component and a foreground component,
wherein the background component is activated by an operating system of a computer based on a selection of a print button and activates the foreground component, and
wherein the activated foreground component displays a first screen on a display, receives a print setting, determines whether a predetermined item is included in the print setting, and based on a determination that the predetermined item is included in the print setting, erases the first screen from the display and displays a second screen related to the predetermined item on the display.

2. The medium according to claim 1, wherein the first screen indicates that a process is ongoing, and the second screen enables a user to input information related to the predetermined item.

3. The medium according to claim 1, wherein based on a determination that the predetermined item is not included in the print setting, the foreground component erases the first screen.

4. The medium according to claim 2, wherein the predetermined item is an item that indicates that input of information from a user is needed.

5. The medium according to claim 2, wherein the information is a password.

6. The medium according to claim 1, wherein the background component is a component that does not include a screen and the foreground component is a component that includes a screen.

7. An information processing apparatus comprising:
a controller including a processor and a memory that stores an application program including a background component and a foreground component, the controller configured to:
activate the background component based on a selection by a user of a print button;
activate, by executing the activated background component, the foreground component, and
by executing the foreground component, display a first screen on a display, receive a print setting, determine whether a predetermined item is included in the print setting, and based on a determination that the predetermined item is included in the print setting, erase the first screen from the display and displays a second screen related to the predetermined item on the display.

8. The information processing apparatus according to claim 7, wherein the first screen indicates that a process is ongoing, and the second screen enables a user to input information related to the predetermined item.

9. The medium according to claim 7, wherein based on a determination that the predetermined item is not included in the print setting, the foreground component erases the first screen.

10. The information processing apparatus according to claim 8, wherein the predetermined item is an item that indicates that input of information from a user is needed.

11. The information processing apparatus according to claim 8, wherein the information is a password.

12. The information processing apparatus according to claim 7, wherein the background component is a component that does not include a screen and the foreground component is a component that includes a screen.

13. A method for controlling an information processing apparatus including a controller that executes an application program including a background component and a foreground component, the method comprising:
activating the background component based on a selection by a user of a print button;
activating the foreground component by executing the activated background component,
wherein the activated foreground component displays a first screen on a display, receives a print setting, determines whether a predetermined item is included in the print setting, and based on a determination that the predetermined item is included in the print setting, erases the first screen from the display and displays a second screen related to the predetermined item on the display.

14. The method according to claim 13, wherein the first screen indicates that a process is ongoing, and the second screen enables a user to input information related to the predetermined item.

15. The method according to claim 13, wherein based on a determination that the predetermined item is not included in the print setting, the foreground component erases the first screen.

16. The method according to claim 14, wherein the predetermined item is an item that indicates that input of information from a user is needed.

17. The method according to claim 14, wherein the information is a password.

18. The method according to claim 13, wherein the background component is a component that does not include a screen and the foreground component is a component that includes a screen.

* * * * *